US012764210B2

(12) United States Patent
Kim et al.

(10) Patent No.: US 12,764,210 B2
(45) Date of Patent: Oct. 13, 2026

(54) ELECTRONIC DEVICE COMPRISING BATTERY

(71) Applicant: Samsung Electronics Co., Ltd., Gyeonggi-do (KR)

(72) Inventors: Sunjin Kim, Gyeonggi-do (KR); Jooyil Pyun, Gyeonggi-do (KR); Kiyoun Jang, Gyeonggi-do (KR); Yongsub Jeon, Gyeonggi-do (KR); Chihyun Cho, Gyeonggi-do (KR); Jaeman Choi, Gyeonggi-do (KR); Changryong Heo, Gyeonggi-do (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 679 days.

(21) Appl. No.: 18/140,027

(22) Filed: Apr. 27, 2023

(65) Prior Publication Data

US 2023/0269317 A1 Aug. 24, 2023

Related U.S. Application Data

(63) Continuation of application No. PCT/KR2021/016710, filed on Nov. 16, 2021.

(30) Foreign Application Priority Data

Nov. 16, 2020 (KR) ........................ 10-2020-0152606
Apr. 30, 2021 (KR) ........................ 10-2021-0056249

(51) Int. Cl.
*H04M 1/02* (2006.01)
*H01M 50/105* (2021.01)
*H01M 50/184* (2021.01)

(52) U.S. Cl.
CPC ....... *H04M 1/0262* (2013.01); *H01M 50/105* (2021.01); *H01M 50/184* (2021.01); *H01M 2220/30* (2013.01)

(58) Field of Classification Search
None
See application file for complete search history.

(56) References Cited

U.S. PATENT DOCUMENTS

2011/0274955 A1 11/2011 Park et al.
2012/0177984 A1 7/2012 Lee et al.
(Continued)

FOREIGN PATENT DOCUMENTS

JP 2014-138943 A 7/2014
JP 2017-157556 A 9/2017
(Continued)

OTHER PUBLICATIONS

Translation of KR 2010-0011154 (Year: 2021).*
(Continued)

*Primary Examiner* — Alix E Eggerding
(74) *Attorney, Agent, or Firm* — CANTOR COLBURN LLP

(57) ABSTRACT

An electronic device and battery are disclosed herein. The electronic device includes a housing having a plate, a base member disposed in the housing and disposed substantially parallel to the plate, and the battery disposed in an area of the base member, and configured to supply power to the electronic device. The battery includes an electrode assembly including a first portion and a second portion having different sizes, and a battery case including a receiving space that houses the electrode assembly, and a sealing portion disposed along an outer periphery of the electrode assembly, wherein the first and second portion meet to form a corner, wherein a first curved structure is formed at the corner, and at least a portion of the sealing portion includes a first elongated structure formed based at least on the first curved structure.

15 Claims, 12 Drawing Sheets

(56) References Cited

U.S. PATENT DOCUMENTS

| | | | | |
|---|---|---|---|---|
| 2015/0037664 | A1* | 2/2015 | Kang | H01M 50/105 429/179 |
| 2017/0092906 | A1 | 3/2017 | Park et al. | |
| 2017/0170437 | A1 | 6/2017 | Lee et al. | |
| 2019/0020055 | A1 | 1/2019 | Chi et al. | |
| 2019/0259979 | A1 | 8/2019 | Ryu et al. | |
| 2020/0044230 | A1 | 2/2020 | Son et al. | |
| 2020/0067172 | A1 | 2/2020 | Park | |
| 2020/0075992 | A1 | 3/2020 | Kandibanda et al. | |
| 2020/0152958 | A1 | 5/2020 | Lee et al. | |
| 2021/0218051 | A1* | 7/2021 | Yan | H01M 50/183 |
| 2021/0283671 | A1* | 9/2021 | Kotik | B21D 51/16 |
| 2022/0123396 | A1 | 4/2022 | Lu et al. | |
| 2023/0013955 | A1 | 1/2023 | Jiang | |

FOREIGN PATENT DOCUMENTS

| | | | | |
|---|---|---|---|---|
| KR | 10-20110105737 | A | 9/2011 | |
| KR | 10-2012-0080732 | A | 7/2012 | |
| KR | 10-2015-0108731 | A | 9/2015 | |
| KR | 10-1666381 | B1 | 10/2016 | |
| KR | 10-2017-0062877 | A | 6/2017 | |
| KR | 10-2017-0089276 | A | 8/2017 | |
| KR | 10-2019-0043251 | A | 4/2019 | |
| KR | 10-2019-0048862 | A | 5/2019 | |
| KR | 10-2019-0057587 | A | 5/2019 | |
| KR | 10-2019-0087787 | A | 7/2019 | |
| KR | 10-2020-0023032 | A | 3/2020 | |
| KR | 20210011154 | A * | 2/2021 | H01M 50/116 |
| KR | 10-2022-0145410 | A | 10/2022 | |
| WO | 2020151392 | A1 | 7/2020 | |

OTHER PUBLICATIONS

Korean Decision to Grant dated Aug. 18, 2025.
Extended European Search Report dated Nov. 14, 2024.
European Office Action issued in Application No. EP 21892402.5-1103; Report mailed Jun. 24, 2026; 6 pages.

* cited by examiner

ELECTRONIC DEVICE COMPRISING BATTERY

CROSS-REFERENCE TO RELATED APPLICATIONS

This application is a continuation of International Application No. PCT/KR2021/016710 designating the United States, filed on Nov. 16, 2021, in the Korean Intellectual Property Receiving Office and claiming priority to Korean Patent Application No. 10-2020-0152606, filed on Nov. 16, 2020, in the Korean Intellectual Property Office, and to Korean Patent Application No. 10-2021-0056249, filed on Apr. 30, 2021, in the Korean Intellectual Property Office, the disclosures of all of which are incorporated by reference herein in their entireties.

BACKGROUND

Field

Certain embodiments of the disclosure relate to an electronic device including a battery.

Description of Related Art

Lithium secondary batteries may be largely classified into cylindrical batteries, prismatic batteries, and pouch batteries depending on their appearance (e.g., battery case), and into lithium ion batteries, lithium ion polymer batteries, and lithium polymer batteries, depending on the type of electrolyte.

Due to the recent design trends toward increasingly compact electronic devices, demand for thin prismatic batteries and pouch-type batteries is increasing. In particular, there is interest in pouch-type batteries that are easily deformable, inexpensive to manufacture, and lightweight.

Pouch-type batteries may include secondary batteries in which an electrode assembly and an electrolyte are sealed within a thin film sheet pouch formed by bonding a resin layer and a metal layer. The electrode assembly received in the battery case may include a jelly-roll type (winding-type), stack type, or complex type (stack/folding type) structure.

Meanwhile, due to recent trends and changes, it may be desirable to utilize a new type of battery. In other words, there is a need for a battery that may be utilize according to design particularities of devices to which the battery is to be applied.

Accordingly, atypical structures are increasingly considered, such as batteries having shapes deviating from a general rectangular structure, examples of which may include a stepped or indented structures derived from different sizes of electrode parts, or a geometric structure derived from different shapes of parts of the electrode assembly. Secondary batteries having such atypical structures may be applied to electronic devices of various designs.

As a portion (e.g., a curved portion) of a battery with an atypical structure may utilize a relatively larger heat-fusion sealing area, utilization of interior space of the electronic device may be reduced because of the unnecessarily occupied sealing area.

If an additional sealing portion is secured by forming a space recessed inward of the electrode assembly from the curved portion to enhance the sealing reliability in the portion (e.g., curved portion) of the battery having the atypical structure, the capacity of the battery may be reduced.

According to certain embodiments of the disclosure, there may be provided a battery with sealing reliability enhanced without a reduction in the capacity of the battery.

The disclosure is not limited to the foregoing embodiments but various modifications or changes may rather be made thereto without departing from the disclosure.

SUMMARY

According to certain embodiments of the disclosure, an electronic device may include a housing including a plate, a base member disposed in the housing and disposed substantially parallel to the plate, and a battery disposed in an area of the base member, and configured to supply power to the electronic device, wherein the battery includes: an electrode assembly including a first portion and a second portion having different sizes, a battery case including a receiving space that houses the electrode assembly, and a sealing portion disposed along an outer periphery of the electrode assembly, wherein the first portion and the second portion meet so as to form a corner portion, wherein a first curved structure is formed at the corner portion of the first and second portions, and wherein at least a portion of the sealing portion adjacent to the first curved structure includes a first elongated structure, which is formed based at least on the first curved structure.

According to certain embodiments, a battery may include an electrode assembly including a first portion and a second portion having different sizes, a battery case including a receiving space that houses the electrode assembly, and a sealing portion disposed along an outer periphery of the electrode assembly, wherein the first portion and the second portion meet so as to form a corner portion, wherein a first curved structure is formed at the corner portion of the first and second portions, and wherein at least a portion of the sealing portion adjacent to the first curved structure includes a first elongated structure, which is formed based at least on the first curved structure.

According to certain embodiments of the disclosure, the battery may include an elongated structure positioned on the outer periphery of the battery case corresponding to the curved portion of the battery having an atypical structure. It is possible to enhance sealing reliability without reducing battery capacity by the elongated structure of the battery case.

DETAILED DESCRIPTION

Figure 1:
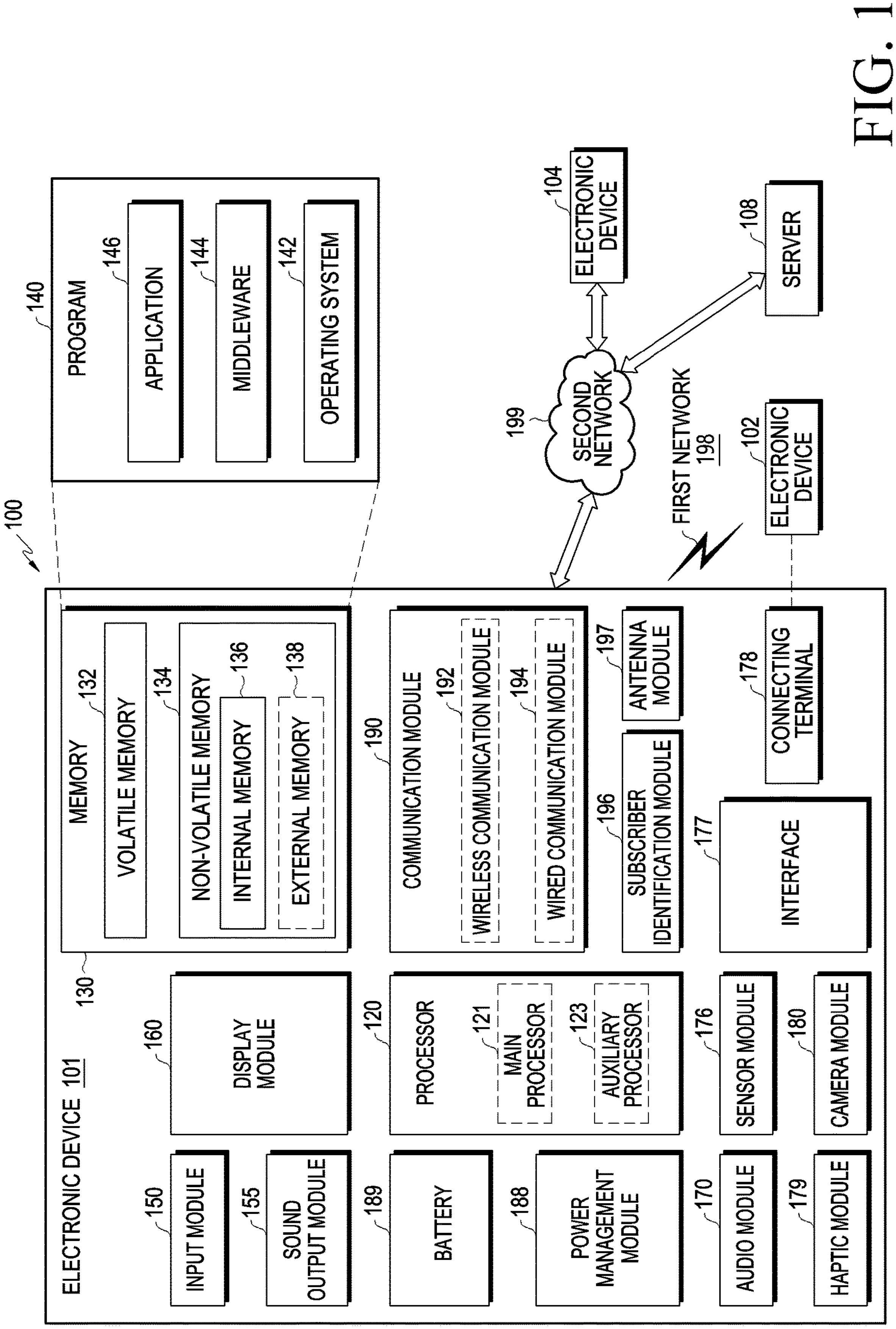
FIG. 1 is a block diagram illustrating an electronic device in a network environment according to certain embodiments of the disclosure.

FIG. 1 is a block diagram illustrating an electronic device in a network environment according to certain embodiments of the disclosure;

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery or a battery pack including a plurality of batteries (hereinafter, referred to as battery) 189, a communication module 190, a subscriber identification module (SIM) 196, or an antenna module 197. In an embodiment, at least one (e.g., the connecting terminal 178) of the components may be omitted from the electronic device 101, or one or more other components may be added in the electronic device 101. According to an embodiment, some (e.g., the sensor module 176, the camera module 180, or the antenna module 197) of the components may be integrated into a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134, which may include internal memory 136 and external memory 138. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be configured to use lower power than the main processor 121 or to be specified for a designated function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. The artificial intelligence model may be generated via machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by other component (e.g., the processor 120) of the electronic device 101, from the exterior (e.g., a user) of the electronic device 101. The input module 150 may include, for example, a microphone, a mouse, a keyboard, keys (e.g., buttons), or a digital pen (e.g., a stylus pen).

The sound output module 155 may output sound signals to the exterior of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the exterior (e.g., a user) of the electronic device 101. The display module 160 may include, for example, a display, a hologram device, or a projector and control circuitry to control a corresponding one of the display, hologram device, and projector. According to an embodiment, the display 160 may include a touch sensor configured to detect a touch, or a pressure sensor configured to measure the intensity of a force generated by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via a first network 198 (e.g., a short-range communication network, such as Bluetooth™, wireless-fidelity (Wi-Fi) direct, or infrared data association (IrDA)) or a second network 199 (e.g., a long-range communication network, such as a legacy cellular network, a 5G network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the exterior (e.g., the external electronic device). According to an embodiment, the antenna module may include an antenna including a radiator formed of a conductor or conductive pattern formed on a substrate (e.g., a printed circuit board (PCB)). According to an embodiment, the antenna module 197 may include a plurality of antennas (e.g., an antenna array). In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

According to certain embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. The external electronic devices 102 or 104 each may be a device of the same or a different type from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or health-care) based on 5G communication technology or IoT-related technology.

The electronic device according to certain embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that certain embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

According to certain embodiments, each component (e.g., a module or a program) of the above-described components may include a single entity or multiple entities. Some of the plurality of entities may be separately disposed in different components. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

Figure 2A:
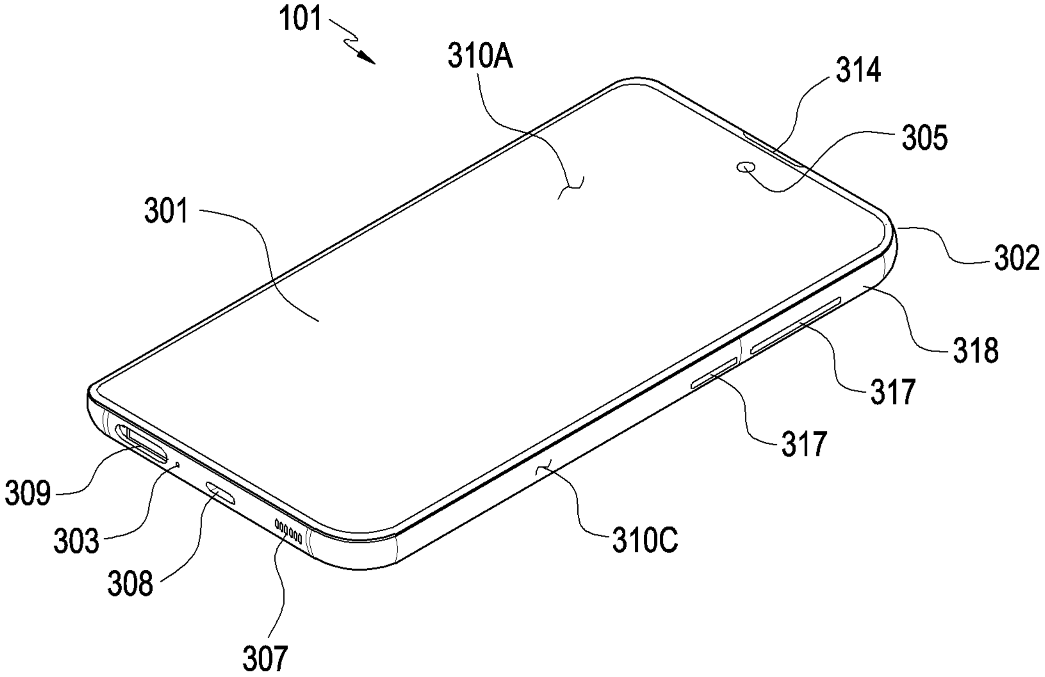
FIG. 2A is a front perspective view illustrating an electronic device 101 according to certain embodiments of the disclosure.
Figure 2B:
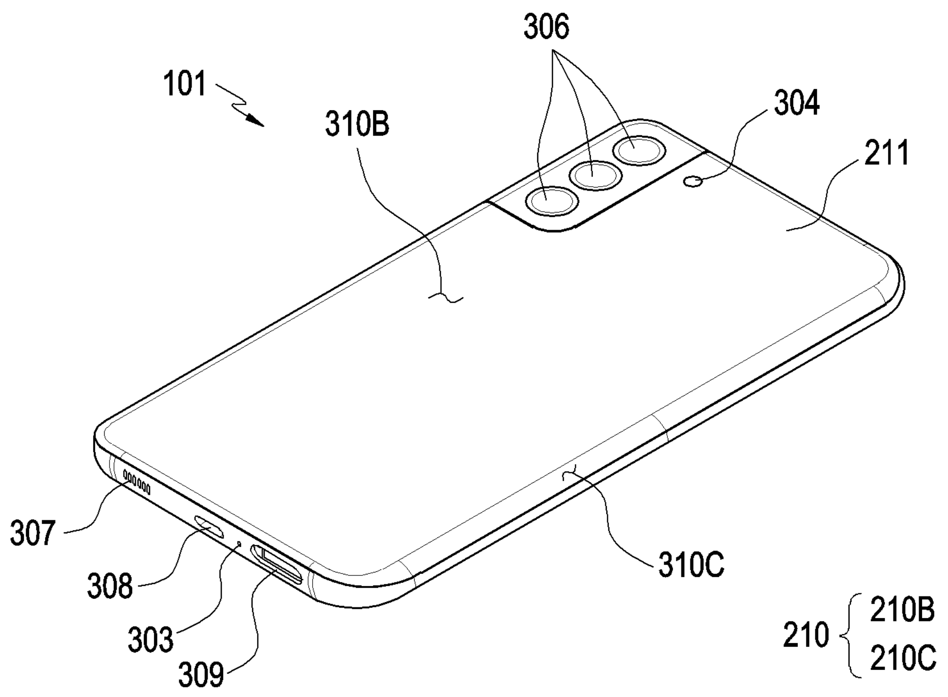
FIG. 2B is a rear perspective view illustrating an electronic device 101 according to certain embodiments of the disclosure.

FIG. 2A is a front perspective view illustrating an electronic device 101 according to certain embodiments of the disclosure. FIG. 2B is a rear perspective view illustrating an electronic device 101 according to certain embodiments of the disclosure.

Referring to FIGS. 2A and 2B, according to an embodiment, an electronic device 101 may include a housing 310 with a front surface 310A, a rear surface 310B, and a side surface 310C surrounding a space between the front surface 310A and the rear surface 310B. According to another embodiment (not shown), the housing 310 may denote a structure forming part of the front surface 310A of FIG. 2A, the rear surface 320B of FIG. 2B, and the side surface 310C. According to an embodiment, at least part of the front surface 310A may have a substantially transparent front plate 302 (e.g., a glass plate or polymer plate including various coat layers). The rear surface 310B may be formed by a rear plate 311. The rear plate 311 may be formed of, e.g., glass, ceramic, polymer, metal (e.g., aluminum, stainless steel (STS), or magnesium), or a combination of at least two thereof. The side surface 310C may be formed by a side bezel structure (or a "side member") 318 that couples to the front plate 302 and the rear plate 311 and includes a metal and/or polymer. According to an embodiment, the rear plate 311 and the side bezel plate 318 may be integrally formed together and include the same material (e.g., glass, metal, such as aluminum, or ceramic). According to another embodiment, the front surface 310A and/or the front plate 302 may include a part of the display 301.

According to an embodiment, the electronic device 101 may include at least one of a display 301, audio modules 303, 307, and 314 (e.g., the audio module 170 of FIG. 1), a sensor module (e.g., the sensor module of FIG. 1). 176), camera modules 305 and 306 (e.g., the camera module 180 of FIG. 1), a key input device 217 (e.g., the input module 150 of FIG. 1), and connector holes 308 and 309 (e.g., the connection terminal 178 of FIG. 1). According to an embodiment, the electronic device 101 may exclude at least one (e.g., the connector hole 309) of the components or may add other components. According to an embodiment, the display 301 may be visually revealed through, e.g., a majority portion of the front plate 302.

According to an embodiment, the surface (or the front plate 302) of the housing 310 may include a screen display area formed as the display 301 is visually exposed. For example, the screen display area may include the front surface 310A.

According to another embodiment (not shown), the electronic device 101 may include a recess or opening formed in a portion of the screen display area (e.g., the front surface 310A) of the display 301 and may include at least one or more of an audio module 314, a sensor module (not shown), a light emitting device (not shown), and a camera module 305 aligned with the recess or opening. According to another embodiment (not shown), at least one or more of the audio module 314, sensor module (not shown), camera module 305, fingerprint sensor (not shown), and light emitting device (not shown) may be included on the rear surface of the screen display area of the display 301.

According to another embodiment (not shown), the display 301 may be disposed to be coupled with, or adjacent, a touch detecting circuit, a pressure sensor capable of measuring the strength (pressure) of touches, and/or a digitizer for detecting a magnetic field-type stylus pen.

According to an embodiment, at least a portion of the key input device 317 may be disposed on the side bezel structure 318.

According to an embodiment, the audio modules 303, 307, and 314 may include, e.g., a microphone hole and speaker holes. The microphone hole may have a microphone inside to obtain external sounds. According to an embodiment, there may be a plurality of microphones to be able to detect the direction of a sound. The speaker holes may include an external speaker hole and a phone receiver hole. According to an embodiment, the speaker holes and the microphone hole may be implemented as a single hole, or speakers may be rested without the speaker holes (e.g., piezo speakers).

According to an embodiment, the sensor modules (not shown) may generate an electrical signal or data value corresponding to an internal operating state or external environmental state of the electronic device 101. The sensor module (not shown) may include, e.g., a first sensor module (not shown) (e.g., a proximity sensor) and/or a second sensor module (not shown) (e.g., a fingerprint sensor) disposed on the front surface 310A of the housing 310. The sensor module (not shown) may include a third sensor module (not shown) (e.g., an HRM sensor) and/or a fourth sensor module (not shown) (e.g., a fingerprint sensor) disposed on the rear surface 310B of the housing 310). According to another embodiment (not shown), the fingerprint sensor may be disposed on the rear surface 310B as well as on the front surface 310A (e.g., the display 301) of the housing 310. The electronic device 101 may further include sensor modules not shown, e.g., at least one of a gesture sensor, a gyro sensor, an atmospheric pressure sensor, a magnetic sensor, an acceleration sensor, a grip sensor, a color sensor, an infrared (IR) sensor, a biometric sensor, a temperature sensor, a humidity sensor, or an illuminance sensor (not shown).

According to an embodiment, the camera modules 305 and 306 may include a front camera module 305 disposed on the first surface 310A of the electronic device 101 and a rear camera module 306 and/or a flash 304 disposed on the rear surface 310B. The camera modules 305 and 306 may include one or more lenses, an image sensor, and/or an image signal processor. The flash 204 may include, e.g., alight emitting diode (LED) or a xenon lamp. According to an embodiment, two or more lenses (an infrared (IR) camera, a wide-angle lens, and a telescopic lens) and image sensors may be disposed on one surface of the electronic device 101.

According to an embodiment, the key input device 317 may be disposed on the side surface 310C of the housing 310. According to another embodiment, the electronic device 101 may exclude all or some of the above-mentioned key input devices 317 and the excluded key input devices 317 may be implemented in other forms, e.g., as soft keys, on the display 301.

According to an embodiment, the light emitting device may be disposed on, e.g., the front surface 310A of the housing 310. The light emitting device (not shown) may provide, e.g., information about the state of the electronic device 101 in the form of light. According to another embodiment, the light emitting device (not shown) may provide a light source that interacts with, e.g., the front camera module 305. The light emitting device (not shown) may include, e.g., a light emitting diode (LED), an infrared (IR) LED, and/or a xenon lamp.

According to an embodiment, the connector holes 308 and 309 may include a first connector hole 308 for receiving a connector (e.g., an earphone jack) for transmitting/receiving audio signals to/from an external electronic device or a connector (e.g., a USB connector) for transmitting/receiving power and/or data to/from the external electronic device and/or a second connector hole 309 for receiving a storage device (e.g., a subscriber identification module (SIM) card). According to an embodiment, the first connector hole 308 and/or the second connector hole 309 may be omitted.

Figure 3:
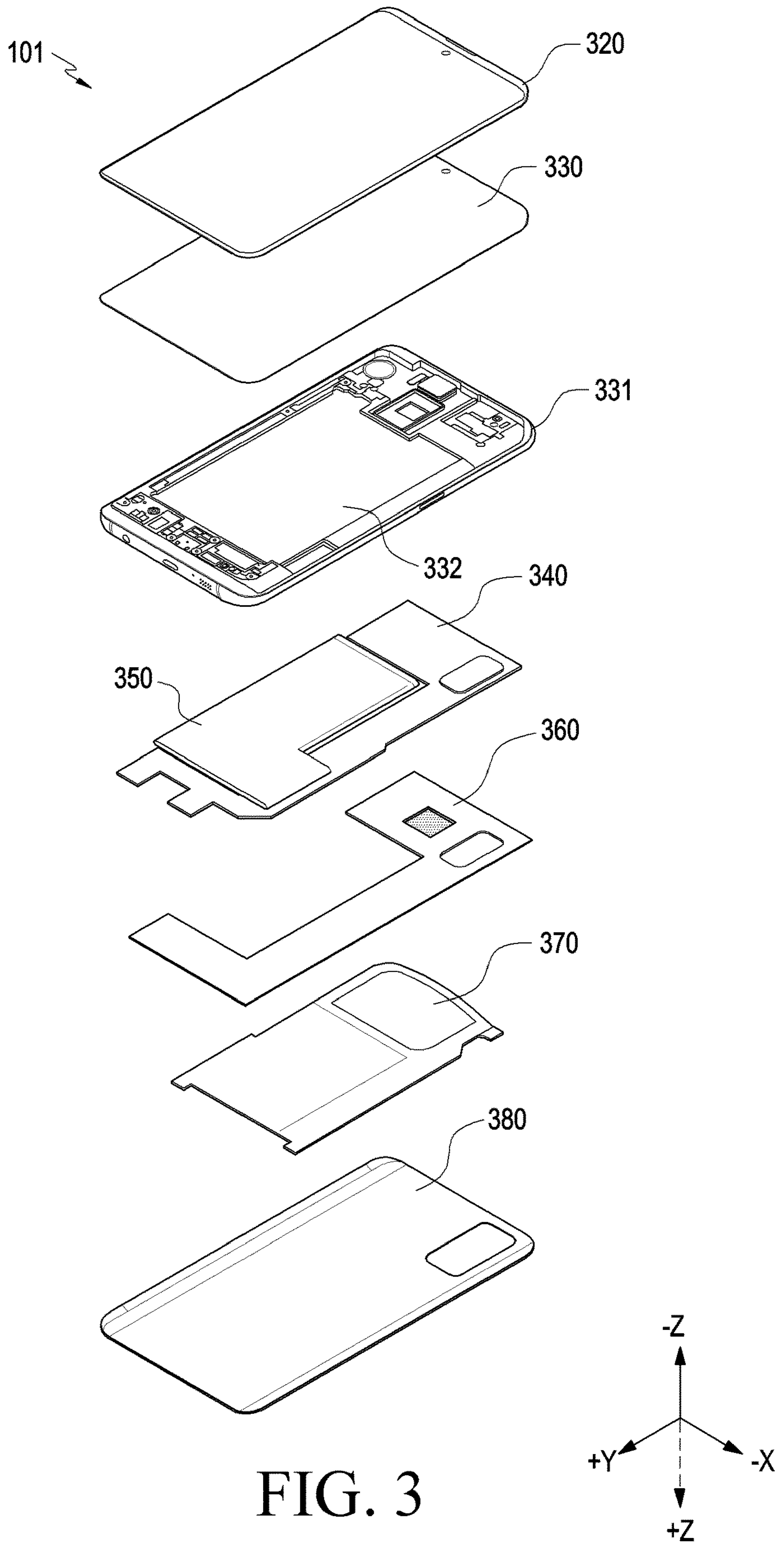
FIG. 3 is a perspective view illustrating an electronic device according to certain embodiments of the disclosure.

FIG. 3 is a perspective view illustrating an electronic device according to certain embodiments of the disclosure;

Referring to FIG. 3, an electronic device 101 (e.g., the electronic device 101 of FIGS. 2A and 2B) may include at least one of a front plate 320 (e.g., the front plate 302 of FIG. 2A), a display 330 (e.g., the display 301 of FIG. 2A), a first supporting member 332 (e.g., a bracket), a printed circuit board 340, a battery 350, a second supporting member 360 (e.g., a rear case), an antenna 370, and a rear plate 380 (e.g., the rear plate 311 of FIG. 2B). According to an embodiment, the electronic device 101 may exclude at least one (e.g., the first supporting member 332 or the second supporting member 360) of the components or may add other components. At least one of the components of the electronic device 101 may be the same or similar to at least one of the components of the electronic device 101 of FIG. 2A or 2B and no duplicate description is made below.

According to an embodiment, the first supporting member 332 may be disposed inside the electronic device 101 to be connected with the side bezel structure 331 or integrated with the side bezel structure 331. The first supporting member 332 may be formed of, e.g., a metallic material and/or non-metallic material (e.g., polymer). The display 330 may be joined onto one surface of the first supporting member 332, and the printed circuit board 240 may be joined onto the opposite surface of the first supporting member 311. A processor, memory, and/or interface may be mounted on the printed circuit board 340. The processor may include one or more of, e.g., a central processing unit, an application processor, a graphic processing device, an image signal processing, a sensor hub processor, or a communication processor. According to an embodiment, the memory may include, e.g., a volatile or non-volatile memory. According to an embodiment, the interface may include, e.g., a high definition multimedia interface (HDMI), a universal serial bus (USB) interface, a secure digital (SD) card interface, and/or an audio interface. The interface may electrically or physically connect, e.g., the electronic device 101 with an external electronic device and may include a USB connector, an SD card/multimedia card (MMC) connector, or an audio connector. According to an embodiment, the battery 350 (e.g., the battery 189 of FIG. 1) may be a device for supplying power to at least one component (e.g., the camera module 312) of the electronic device 101. The battery 189 may include, e.g., a primary cell which is not rechargeable, a secondary cell which is rechargeable, or a fuel cell. At least a portion of the battery 350 may be disposed on substantially the same plane as the printed circuit board 340. The battery 350 may be integrally or detachably disposed inside the electronic device 101. According to an embodiment, the first supporting member 332 may be interpreted as a base member.

According to certain embodiments, the second supporting member 360 (e.g., a rear case) may be disposed between the printed circuit board 340 and the antenna 370. For example, the second supporting member 360 may include one surface to which at least one of the printed circuit board 340 and the battery 350 is coupled, and another surface to which the antenna 370 is coupled.

According to an embodiment, the antenna 370 may be disposed between the rear plate 380 and the battery 350. The antenna 370 may include, e.g., a near-field communication (NFC) antenna, a wireless charging antenna, and/or a magnetic secure transmission (MST) antenna. The antenna 370 may perform short-range communication with, e.g., an external device or may wirelessly transmit or receive power utilized for charging. For example, the antenna 370 may include a coil for wireless charging. According to an embodiment of the present disclosure, an antenna structure may be formed by a portion or combination of the side bezel structure 331 and/or the first supporting member 232.

According to certain embodiments, the electronic device 101 may include a camera module (e.g., the camera module 306 of FIG. 2B) disposed in the housing (e.g., the housing 310 of FIG. 2A). According to an embodiment, the camera module 306 may be disposed on the first supporting member 332 and may be a rear camera module (e.g., the camera module 312 of FIG. 2B) capable of obtaining an image of a subject positioned behind (e.g., the +Z direction) of the electronic device 101. According to an embodiment, at least a portion of the camera module 312 may be exposed to the exterior of the electronic device 101 through the opening 382 formed in the rear plate 380.

The electronic device 101 disclosed in FIGS. 2A to 3 has a bar-type or plate-type appearance but the disclosure is not limited thereto. For example, the illustrated electronic device may be a rollable electronic device or a foldable electronic device. "Rollable electronic device" may mean an electronic device at least a portion of which may be wound or rolled or received in a housing (e.g., the housing 310 of FIG. 2A) as the display (e.g., the display 330 of FIG. 3) may be bent and deformed. As the display is stretched out or is exposed to the exterior in a larger area according to the user's need, the rollable electronic device may use an expanded second display area. "Foldable electronic device" may mean an electronic device that may be folded in directions to face two different areas of the display or in directions opposite to each other. In general, in the portable state, the foldable electronic device may be folded so that the two different areas of the display face each other and, in an actual use state, the user may unfold the display so that the two different areas form a substantially flat shape. In some embodiments, according to certain embodiments of the disclosure, the electronic device 101 may include various electronic devices, such as a laptop computer or a camera, as well as a portable electronic device, such as a smart phone.

In general, to receive the electrode assembly in a pouch-type battery case, a forming process of applying pressure to a flat aluminum battery case in the shape of the electrode assembly to form a three-dimensional structure is utilized. The disclosure applies such a process to implement a sealable length by pressing a curved portion of a battery case utilizing elongation when forming the battery case into a specific shape.

Figure 4A:
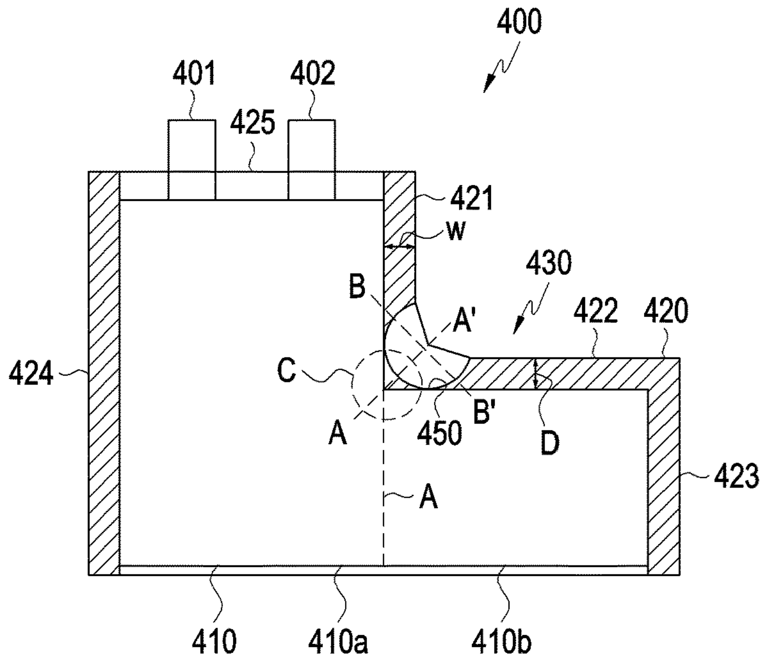
FIG. 4A is a schematic view illustrating an example of a battery having an atypical structure according to certain embodiments of the disclosure.
Figure 4B:
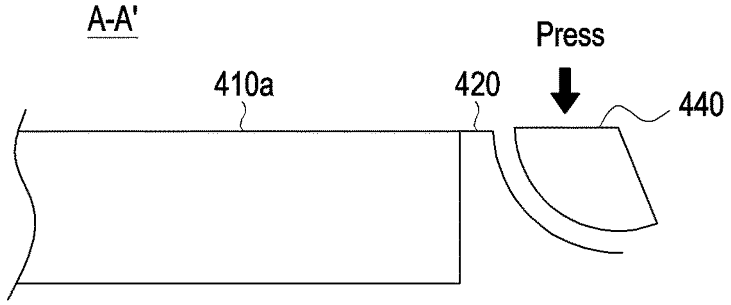
FIG. 4B is a meet-sectional view illustrating a side of the battery of FIG. 4A, taken along direction A-A' according to certain embodiments of the disclosure.
Figure 4C:
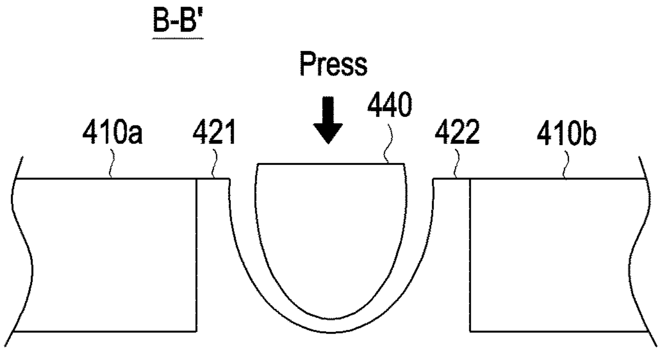
FIG. 4C is a meet-sectional view illustrating a side of the battery of FIG. 4A, taken along direction B-B' according to certain embodiments of the disclosure.

FIG. 4A is a schematic view illustrating an example of a battery having an atypical structure according to certain embodiments of the disclosure. FIG. 4B is a meet-sectional view illustrating a side of the battery of FIG. 4A, taken along direction A-A' according to certain embodiments of the disclosure. FIG. 4C is a meet-sectional view illustrating a side of the battery of FIG. 4A, taken along direction B-B' according to certain embodiments of the disclosure.

Referring to FIGS. 4A to 4C, a battery 400 (e.g., the battery 189 of FIG. 1 and/or the battery 350 of FIG. 3) may include an electrode assembly 410, electrode leads 401 and 402 welded to electrode tabs (not shown) extending from the electrode assembly 410, and a battery case 420 receiving the electrode assembly 410.

According to certain embodiments, the electrode assembly 410 may be a power generation device in which a positive electrode and a negative electrode are sequentially stacked with a separator interposed therebetween, and may include a stack type or a stack/folding type structure. The electrode tabs (not shown) may extend from the electrode plates, respectively, of the electrode assembly 410. The electrode leads 401 and 402 may be electrically connected with the plurality of electrode tabs extending from the electrode plates, respectively, by, e.g., welding, and may be partially exposed to the exterior of the battery case 420. According to an embodiment, an insulation film (not shown) may be attached to portions of the upper and lower surfaces of the electrode leads 401 and 402 to increase the sealability with the battery case 420 and secure electrical insulation.

According to an embodiment, the battery case 420 may include an aluminum laminate sheet, provide a space for receiving the electrode assembly 410, and overall include a pouch shape.

Referring to FIGS. 4A to 4C, the battery 400 may have a structure in which at least a portion of the outer peripheries 421, 422, 423, 424, and 425 of the battery case 420 (having the electrode assembly 410 embedded therein) is heat fusion-sealed.

According to certain embodiments, the electrode assembly 410 may have a flat shape, and two portions 410*a* and 410*b* of the electrode assembly 410 having different sizes may be divided by the boundary A, forming a step 430 in the electrode assembly 410, as formed from the size differential between the portions 410*a* and 410*b* of the electrode assembly 410. According to an embodiment, since the battery case 420 may have a shape corresponding to the electrode assembly 410, and the outer peripheries 421, 422, 423, 424, and 425 of the battery case 420 are sealed along the ends of the electrode assembly 410, the battery 400 may thus be formed having an atypical stepped structure including the step 430, rather than a rectangular structure, as corresponding to the shape of the electrode assembly 410.

According to certain embodiments, in the battery 400, the outer peripheries 421 and 422 of the battery case 420 meet each other (e.g., orthogonally) at the curved portion C, which may also be referred to as a “meeting portion,” “a crossing portion,” or a “corner portion,” etc. The curved portion C approximately aligns via virtual line A to where the outer peripheries of the portions 410*a* and 410*b* of the electrode assembly 410 meet. An elongated portion 450 may be formed by pressing by the forming jig 440 in the meeting portion where outer peripheries 421 and 422 of the battery case 420 meet. According to an embodiment, the length of the elongated portion 450 may be determined depending on at least one of the curvature of the curved portion C of the battery 400 or the width W of the different meeting outer peripheries 421 and 422 of the battery case 420. According to an embodiment, the forming jig 440 may have various structures as described below, depending on the length and/or shape utilized for the elongated portion 450. According to an embodiment, the elongated portion 450 may be sealed considering at least one of the curvature of the curved portion C of the battery 400, the thickness of the battery case 420, or the width W of the different meeting outer peripheries 421 and 422 of the battery case 420.

According to the structure of the battery 400 of FIGS. 4A to 4C, additional elongation may be performed on the portion where the different outer peripheries 421 and 422 of the battery case 420 forming the curved portion C meet each other, heat-fusion sealing the portion where the outer peripheries 421 and 422 are connected, without cutting. According to an embodiment, as the outer peripheries 421 and 422 of the battery case 420 are heat-fusion sealed through elongation in the portion where the different outer peripheries 421 and 422 of the battery case 420 meet one another (e.g., orthogonally), the need for forming a space recessed inward of the electrode assembly 410 to secure an additional sealing area is reduced, thereby maintaining and/or increasing the battery capacity.

Figure 5:
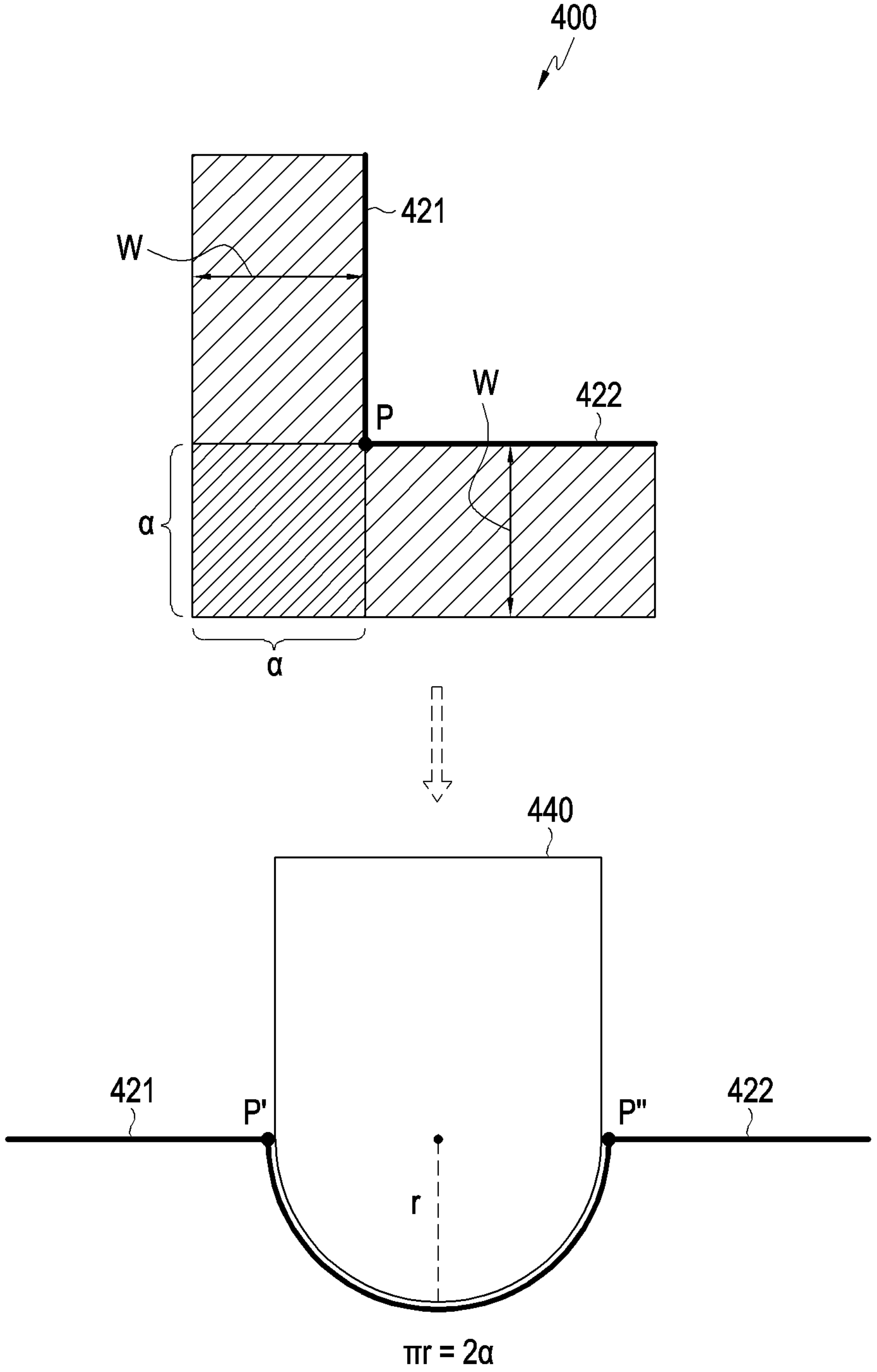
FIG. 5 is a view illustrating a process in which a portion where different outer peripheries of a battery case meet each other is elongated by a forming jig according to certain embodiments of the disclosure.

FIG. 5 is a view illustrating a process in which a portion where different outer peripheries of a battery case meet each other is elongated by a forming jig according to certain embodiments of the disclosure.

Referring to FIG. 5, the outer peripheries 421 and 422 of the battery case 420 of the battery 400 (e.g., the battery 400 of FIGS. 4A to 4C) orthogonally contact at the meeting point, and each may have length a of sealing width W. When the outer periphery 422 of the battery case 420 is pressed toward the meeting point P at 45 degrees by a hemispherical forming jig 440, the meeting point P may be elongated along the outer shape of the hemispherical forming jig. The length of the curve P'P" formed as the meeting point P is elongated may be referred to as an elongated length and may have a length corresponding to the circumference of the semi-circle which is a meet section of the hemispherical forming jig.

According to certain embodiments, when elongation is performed, for sealing, in the portion of the outer peripheries 421 and 422 of the battery case 420 that meet correspond to the curved portion, the minimum elongated length may correspond to twice the sealing width W of the outer peripheries 421 and 422 of the battery case 420. In the embodiment of FIG. 5, when the length of the sealing width W of the outer peripheries 421 and 422 of the battery case 420 is a, and the length of the curve P'P" corresponding to the elongated length is $\pi r$ which corresponds to the circumference of the semi-circle which is a meet section of the hemispherical forming jig whose radius is r, Equation 1 below may be met.

$$\pi r \geq 2a \quad \text{[Equation 1]}$$

In the embodiment of FIG. 5, when elongation is performed by pressing the meeting portion of the outer peripheries 421 and 422 of the battery case 420 connected corresponding to the curved portion by the hemispherical forming jig, the minimum value of radius r of the hemispherical forming jig may be $2a/\pi$.

Although the relationship between the elongated length and the sealing width is described by taking a hemispherical forming jig as an example in the embodiment of FIG. 5, the disclosure is not limited thereto, and various shapes of forming jigs may be applied to certain embodiments of the disclosure as described below. However, even in such a case, the shape of the forming jig should be determined depending on the desired length and/or shape of the elongated portion.

Figure 6:
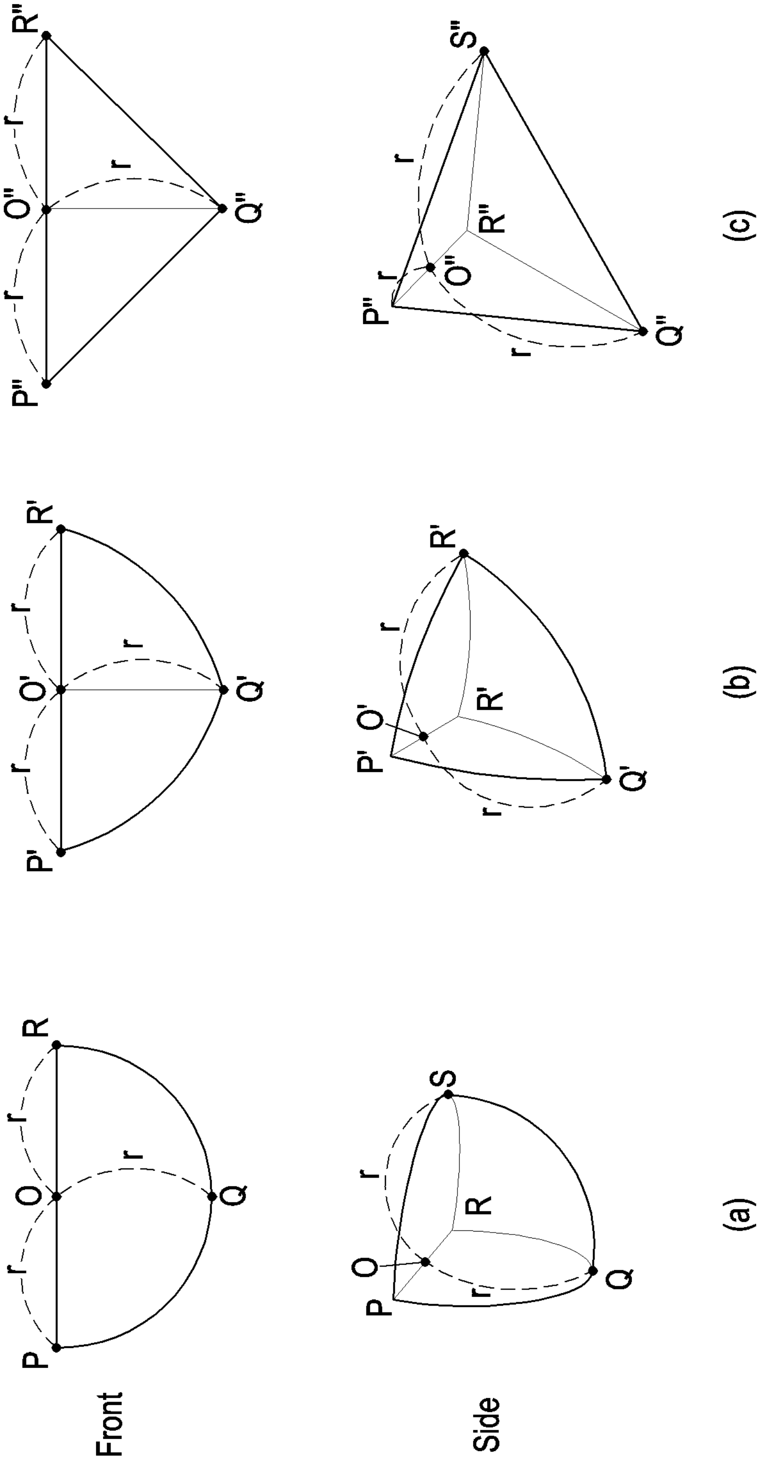
FIG. 6 is a view illustrating examples of various shapes of a forming jig according to certain embodiments of the disclosure.

FIG. 6 is a view illustrating examples of various shapes of a forming jig according to certain embodiments of the disclosure.

Referring to (a) of FIG. 6, when the center of straight line PR is O, and the center of curve PR is Q, the forming jig at front view may have a shape of semi-circle PQR in which straight line PO, straight line OQ, and straight line OR all have the same length r, and the curvature k of curve PQ and curve RQ is 1/r. Further, the forming jig at side view may have a hemispherical shape which includes a semi-circle PRS perpendicular to the semi sphere PQR of the forming jig positioned on the YZ plane, positioned on the XY plane, and having a radius r (where, S is the center of curve PR), and in which the curvature of curve SQ is 1/r.

When elongation is performed through the forming jig according to (a) of FIG. 6, the elongated length corresponds to the length of curve PQR and may be $\pi r$. According to an embodiment, when the elongated length may be represented as $\pi r$, and the length of the sealing width is a, Equation 1 above may be met.

Referring to (b) of FIG. 6, when the center of straight line P'R' is O', and O'Q' is perpendicular to straight line P'R' and has the same length as straight line P'O', the forming jig at front view may have a shape (hereinafter, referred to as a pseudo semi-circle) in which straight line P'O', straight line O'Q', and straight line O'R' all have the same length r, and the curvature k of curve P'Q' and curve R'Q' is a value between 0 and 1/r. According to an embodiment, the forming jig at side view may have a shape (hereinafter, referred to as a pseudo hemispherical shape) which includes a pseudo semi-circle P'R'S' perpendicular to the pseudo semi-circle P'Q'R' of the forming jig positioned on the YZ plane and positioned on the XY plane (where, S' is perpendicular to O'S' and P'R', and O'S' and P'O' have the same length), and in which the curvature of curve S'Q' is 1/r.

When elongation is performed through the forming jig according to (b) of FIG. 6, the elongated length may have a value corresponding to the sum of the length of curve P'Q' and the length of curve R'Q'. According to an embodiment, the elongated length meets Equation 2 below when the length of the sealing width is a. d1 may be the length of curve P'Q', and d2 may be the length of curve R'Q'.

$$\pi r > d1 + d2 \geq 2a \qquad \text{[Equation 2]}$$

Referring to (c) of FIG. 6, when the center of straight line P'R' is O', and O'Q' is perpendicular to straight line P'R' and has the same length as straight line P'O', the forming jig at front view may have a rectangular shape P"Q"R" in which straight line P"O", straight line O"Q", and straight line O"R" all have the same length r, the length of straight line P"R" corresponding to the base is 2r, and the length of straight line O"Q" corresponding to the height is r. According to an embodiment, the forming jig at side view may have a triangular-based pyramid shape which includes a triangle P"R"S" perpendicular to the triangle P"Q"R" of the forming jig positioned on the YZ plane and positioned on the XY plane (where, S" is perpendicular to O"S" and P"R", and O"S" and P"O" have the same length), and in which the curvature k of straight line S"Q" is 0.

When elongation is performed through the forming jig according to (c) of FIG. 6, the elongated length may have a value corresponding to the sum of the length of straight line P"Q" and the length of straight line R"Q". According to an embodiment, when the elongated length may be represented as $2\sqrt{2}r$ and the length of the sealing width is a, Equation 3 below may be met.

$$2\sqrt{2} \geq 2a \qquad \text{[Equation 3]}$$

In FIG. 6, the hemispherical shape, the pseudo hemispheric shape, and the triangular-based pyramid shape have been described as shapes of the forming jig. These shapes may include a structure that may be deeply pressed outward of the sealing portion. According to an embodiment, the shape of the forming jig of the disclosure is not limited to the shapes illustrated in FIG. 6 but may have various shapes that have a structure that may be deeply pressed outward of the sealing portion and meet the above-described shape conditions of the forming jig.

Figure 7A:
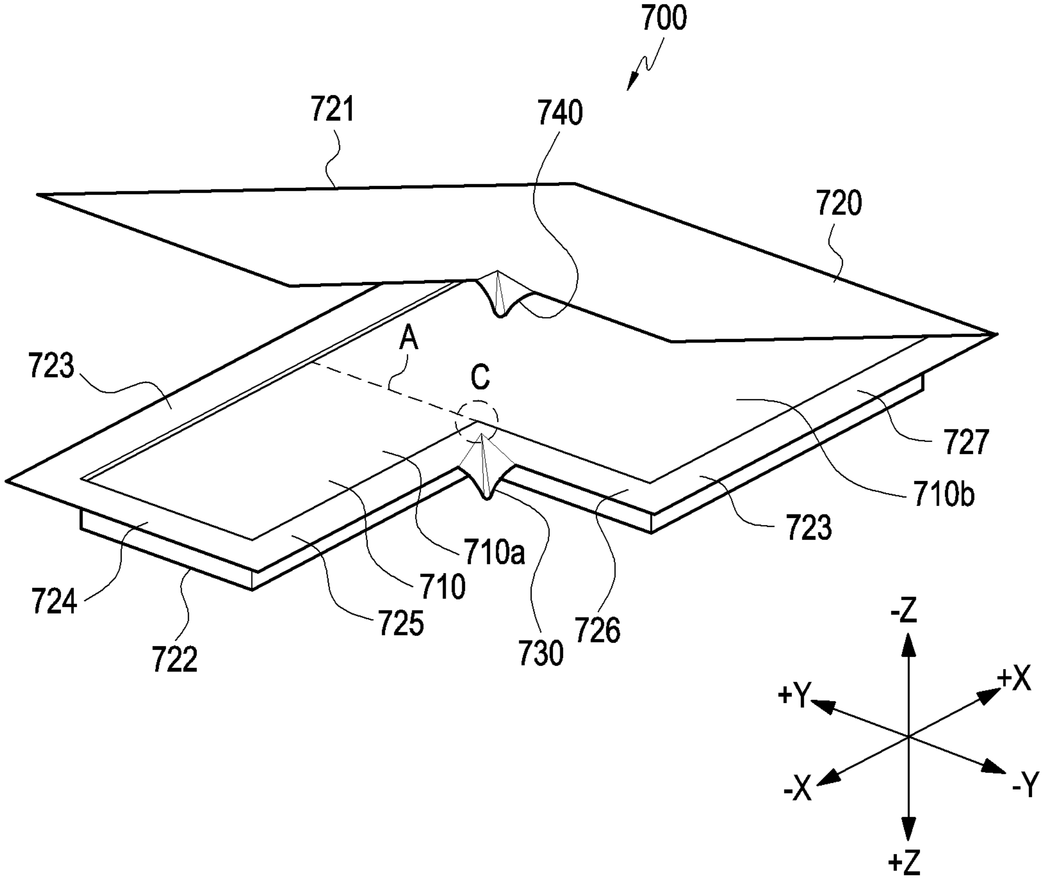
FIG. 7A is a view illustrating a battery case including an elongated portion according to certain embodiments of the disclosure.
Figure 7B:
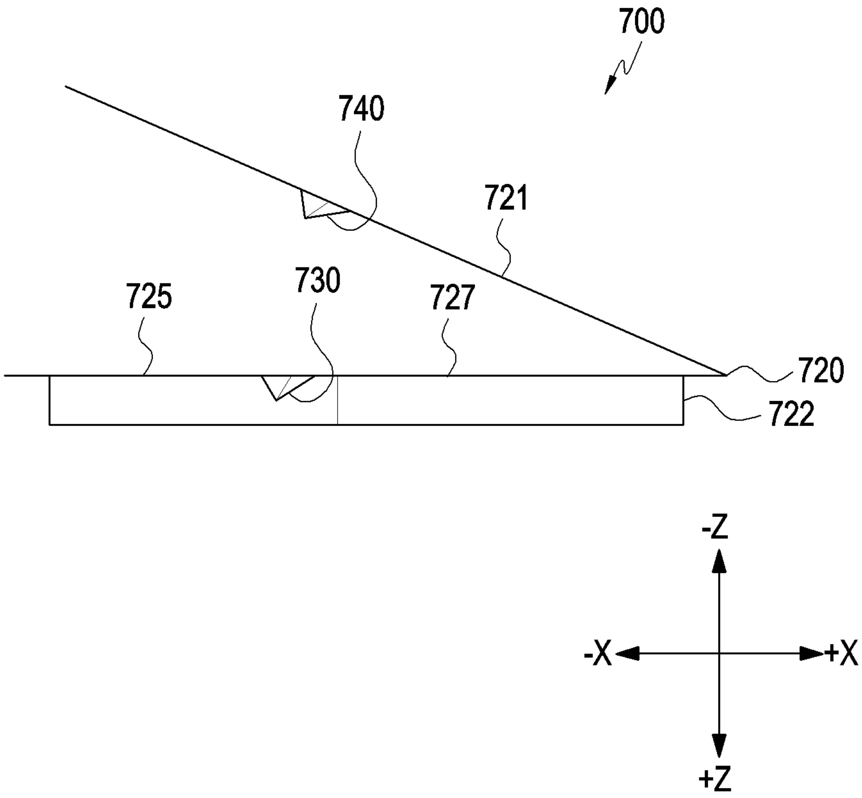
FIG. 7B is a view illustrating a side surface of the battery of FIG. 7A according to certain embodiments of the disclosure.

FIG. 7A is a view illustrating a battery case including an elongated portion according to certain embodiments of the disclosure. FIG. 7B is a view illustrating a side surface of the battery of FIG. 7A according to certain embodiments of the disclosure.

Referring to FIGS. 7A and 7B, a battery 700 (e.g., the battery 189 of FIG. 1 and/or the battery 350 of FIG. 3) may include an electrode assembly 710, electrode leads (not shown) welded to electrode tabs (not shown) extending from the electrode assembly 710, and a battery case 720 including a mounting space for receiving the electrode assembly 710.

According to certain embodiments, the electrode assembly 710 may include a flat shape, and two portions 710*a* and 710*b* of the electrode assembly 710 may be formed so as to have different sizes, and are divided by the boundary A, forming a step in the electrode assembly 710, which it formed from the difference in size between the portions 710*a* and 710*b* of the electrode assembly 710. According to an embodiment, the battery case 720 may include an upper case 721 and a lower case 722. The lower case 722 of the battery case 720 may be formed by forming a flat aluminum plate having the same shape as the upper case 721 into the shape corresponding to the electrode assembly 710, and the electrode assembly 710 may be received in the internal space formed in the forming process. According to an embodiment, the lower case 722 of the battery case 720 may include outer peripheries 723, 724, 725, 726, and 727 that are coupled with the upper case 721 and sealed.

According to certain embodiments, in the battery 700, the different outer peripheries 725 and 726 of the lower case 720 meet each other for the lower case 722 of the battery case 720 to correspond to such a shape in the curved portion C where the outer peripheries of the portions 710*a* and 710*b* of the electrode assembly 710 meet each other, and a first elongated portion 730 may be elongated by pressing by the forming jig (not shown) into the meeting portion of the different outer peripheries 725 and 726 of the lower case 720. The elongated length of the first elongated portion 730 may be determined depending on the curvature of the curved portion C of the battery 700 and the sealing width of the different meeting outer peripheries 725 and 726 of the lower case 722. According to an embodiment, the upper case 721 of the battery case 720 may include a second elongated portion 740 which is elongated by pressing by the same forming jig in the portion corresponding to the meeting portion of the different outer peripheries 725 and 726 of the lower case 722. According to an embodiment, when the upper case 721 of the battery case 720 is folded toward the lower case 722, the second elongated portion 740 of the upper case 721 may overlap the first elongated portion 730 of the lower case 722. A double-sided forming process may be performed on the upper case 721 and lower case 722 of the battery case 720 using the forming jig having the same shape.

Figure 8:
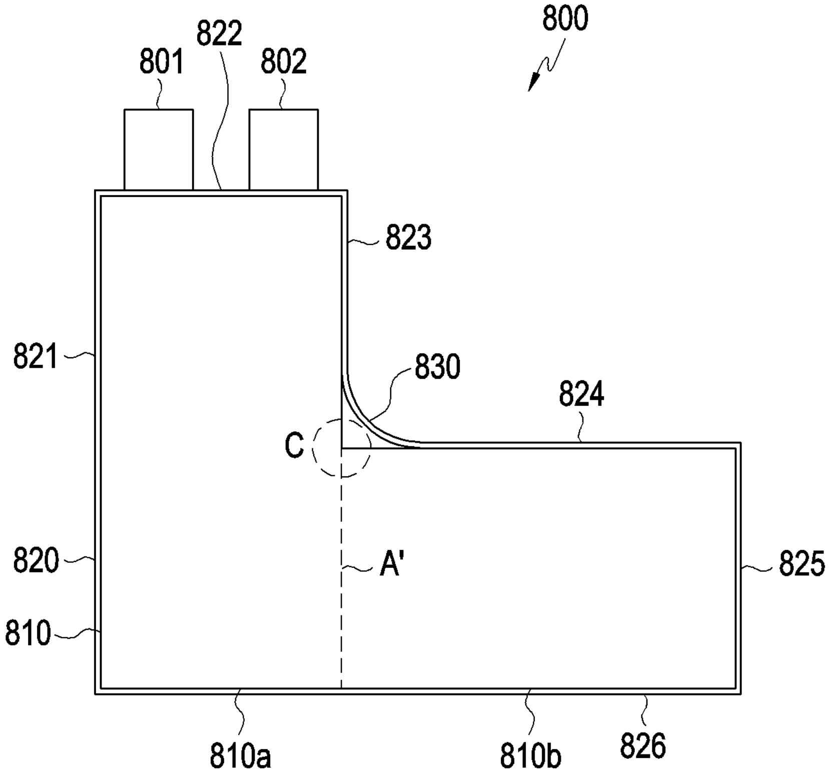
FIG. 8 is a schematic view illustrating an example of a battery according to certain embodiments of the disclosure.
Figure 9:
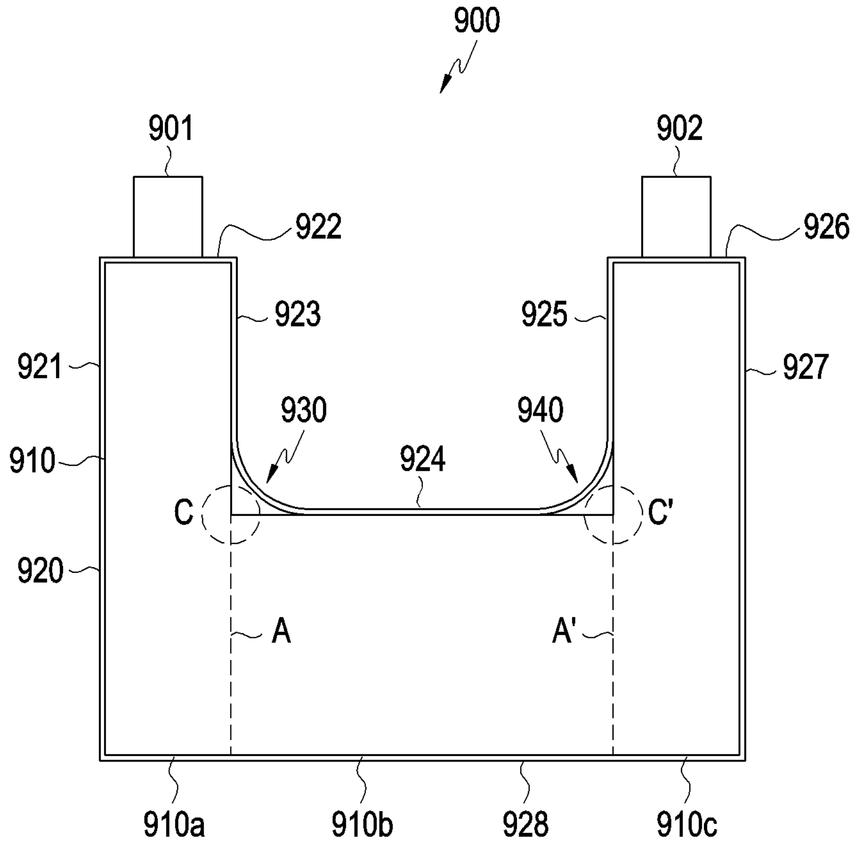
FIG. 9 is a schematic view illustrating an example of a battery according to another embodiment of the disclosure.
Figure 10:
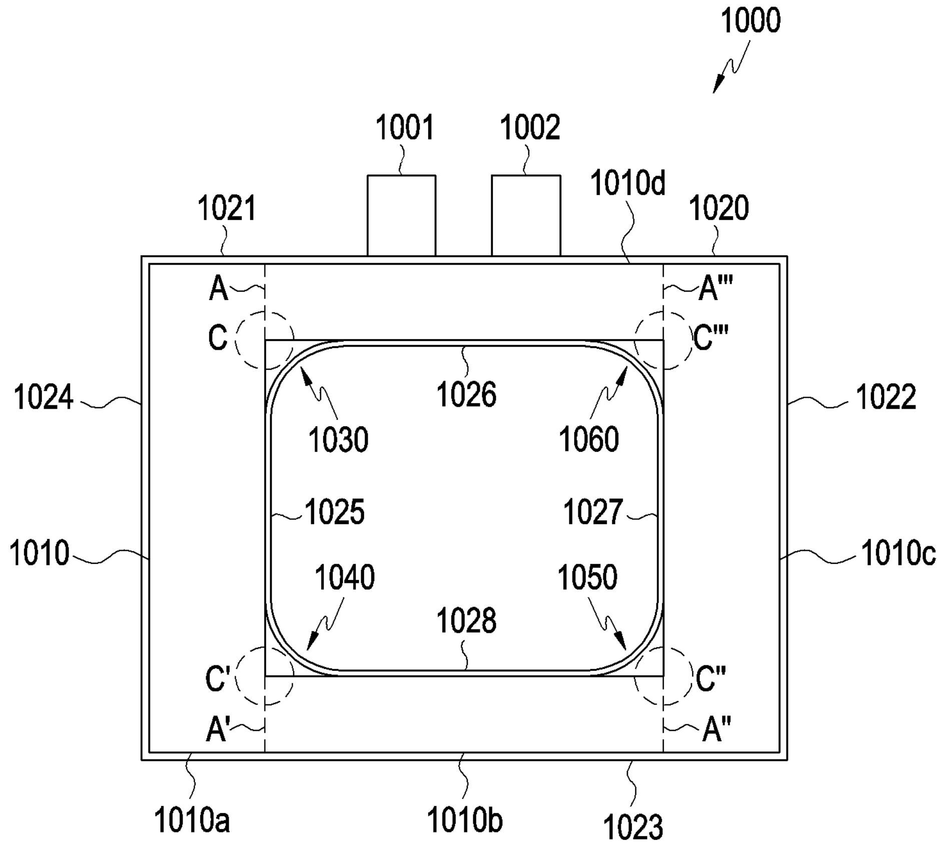
FIG. 10 is a schematic view illustrating an example of a battery according to another embodiment of the disclosure.

FIG. 8 is a schematic view illustrating an example of a battery according to certain embodiments of the disclosure. FIG. 9 is a schematic view illustrating an example of a battery according to another embodiment of the disclosure. FIG. 10 is a schematic view illustrating an example of a battery according to another embodiment of the disclosure.

Referring to FIG. 8, a battery 800 (e.g., the battery 189 of FIG. 1 and/or the battery 350 of FIG. 3) may include an electrode assembly 810, electrode leads 801 and 802 welded to electrode tabs (not shown) extending from the electrode assembly 810, and a battery case 820 receiving the electrode assembly 810.

According to certain embodiments, the electrode assembly 810 may include a flat shape. Two portions 810*a* and 810*b* of the electrode assembly 810 may have different sizes, and are divided by the boundary A', forming a step in the electrode assembly 810, which is formed from the difference in size between the portions 810*a* and 810*b* of the electrode assembly 810. According to an embodiment, the curved portion C may be formed where the outer peripheries of the portions 810*a* and 810*b* of the electrode assembly 810 meet each other.

According to an embodiment, the battery case 820 may have a shape corresponding to the electrode assembly 810. The outer peripheries 821, 822, 823, 824, 825, and 826 of the battery case 820 may be sealed along ends of the electrode assembly 810. According to an embodiment, the different outer peripheries 823 and 824 of the battery case 820 may meet each other for the battery case 820 to correspond to a shape in the curved portion C, where the outer peripheries of the portions 810*a* and 810*b* of the electrode assembly 810 meet each other, and an elongated portion 830 (i.e., elongated through a forming process and heat-fusion sealed) may be included in the portion where the different outer peripheries 823 and 824 of the battery case 820 meet each other.

Referring to FIG. 9, a battery 900 (e.g., the battery 189 of FIG. 1 and/or the battery 350 of FIG. 3) may include an electrode assembly 910, electrode leads 901 and 902 welded to electrode tabs (not shown) extending from the electrode assembly 910, and a battery case 920 receiving the electrode assembly 910.

According to certain embodiments, the electrode assembly 910 may have a flat shape, and three different portions 910*a*, 910*b*, and 910*c* having different sizes may be divided by the boundary A and boundary A', thereby forming a first step formed from a difference in size between the portions 910*a* and 910*b* of the electrode assembly 910, and a second step formed from a difference in size between the portions 910*b* and 910*c* of the electrode assembly 910. According to an embodiment, a first curved portion C may be formed where the outer peripheries of the portions 910*a* and 910*b* of the electrode assembly 910 meet each other, and a second curved portion C' may be formed in the portion where the outer peripheries of the portions 910*b* and 910*c* of the electrode assembly 910 meet each other.

According to certain embodiments, the battery case 920 have include a shape corresponding to the electrode assembly 910. The outer peripheries 921, 922, 923, 924, 925, 926, 927, and 928 of the battery case 920 may be sealed along ends of the electrode assembly 910. According to an embodiment, the different outer peripheries 923 and 924 of the battery case 920 may meet each other for the battery case 920 to correspond to such a shape in the first curved portion C where the outer peripheries of the portions 910*a* and 910*b* of the electrode assembly 910 meet each other. A first elongated portion 930 may be elongated through a forming process, and heat-fusion sealed. The first elongated portion 930 may be included where the different outer peripheries 923 and 924 of the battery case 920 meet each other. According to an embodiment, the different outer peripheries 924 and 925 of the battery case 920 may meet each other for the battery case 920 to correspond to such a shape in the second curved portion C' where the outer peripheries of portions 910*b* and 910*c* of the electrode assembly 910 meet each other, and a second elongated portion 940 (i.e., also elongated through a forming process and heat-fusion sealed) may be included in the portion where the different outer peripheries 924 and 925 of the battery case 920 meet each other.

Referring to FIG. 10, a battery 1000 (e.g., the battery 189 of FIG. 1 and/or the battery 350 of FIG. 3) may include an electrode assembly 1010, electrode leads 1001 and 1002 welded to electrode tabs (not shown) extending from the electrode assembly 1010, and a battery case 1020 receiving the electrode assembly 1010.

According to certain embodiments, the electrode assembly 1010 may have a flat shape, and include four different portions 1010*a*, 1010*b*, 1010*c*, and 1010*d* of the electrode assembly 1010 that are divided by the boundary A, boundary A', boundary A", and boundary A'", forming a first step originating a difference in size between the portions 1010*d* and 1010*a* of the electrode assembly 1010, a second step originating from a difference in size between the portions 1010*a* and 1010*b* of the electrode assembly 1010, a third step originating from a difference in size between the portions 1010*b* and 1010*c* of the electrode assembly 1010, and a fourth step originating from a difference in size between the portions 1010*c* and 1010*d* of the electrode assembly 1010, in the electrode assembly 1010. According to an embodiment, a first curved portion C may be formed in the portion where the outer peripheries of the portions 1010*d* and 1010*a* of the electrode assembly 1010 meet each other, a second curved portion C' may be formed in the portion where the outer peripheries of the portions 1010*a* and 1010*b* of the electrode assembly 1010 meet each other, a third curved portion C" may be formed in the portion where the outer peripheries of the portions 1010*b* and 1010*c* of the electrode assembly 1010 meet each other, and a fourth curved portion C'" may be formed in the portion where the outer peripheries of the portions 1010*c* and 1010*d* of the electrode assembly 1010 meet each other.

According to certain embodiments, the battery case 1020 may have a shape corresponding to the electrode assembly 1010. The outer peripheries 1021, 1022, 1023, 1024, 1025, 1026, 1027, and 1028 of the battery case 1020 may be sealed along ends of the electrode assembly 1010. According to an embodiment, the different outer peripheries 1026 and 1025 of the battery case 1020 may meet each other for the battery case 1020 to correspond to such a shape in the first curved portion C where the outer peripheries of the portions 1010*d* and 1010*a* of the electrode assembly 1010 meet each other, and a first elongated portion 1030 (i.e., elongated through a forming process and heat-fusion sealed) may be included in the portion where the different outer peripheries 1026 and 1025 of the battery case 1020 meet each other. According to an embodiment, the different outer peripheries 1025 and 1028 of the battery case 1020 may meet each other for the battery case 1020 to correspond to such a shape in the second curved portion C' where the outer peripheries of the portions 1010*a* and 1010*b* of the electrode assembly 1010 meet each other, and a second elongated portion 1040 (i.e., also elongated through a forming process and heat-fusion sealed) may be included in the portion where the different outer peripheries 1025 and 1028 of the battery case 1020 meet each other. According to an embodiment, the different outer peripheries 1028 and 1027 of the battery case 1020 may meet each other for the battery case 1020 to correspond to such a shape in the third curved portion C" where the outer peripheries of the portions 1010*b* and 1010*c* of the electrode assembly 1010 meet each other, and a third elongated portion 1050 (i.e., elongated through a forming process and heat-fusion sealed) may be included in the portion where the different outer peripheries 1028 and 1027 of the battery case 1020 meet each other. According to an embodiment, the different outer peripheries 1027 and 1026 of the battery case 1020 may meet each other for the battery case 1020 to correspond to such a shape in the fourth curved portion C''' where the outer peripheries of the portions 1010*c* and 1010*d* of the electrode assembly 1010 meet each other, and a fourth elongated portion 1060 (i.e., elongated through a forming process and heat-fusion sealed) may be included in the portion where the different outer peripheries 1027 and 1026 of the battery case 1020 meet each other.

According to certain embodiments of the disclosure, an electronic device (e.g., 101 of FIGS. 1 to 3) may include a housing including a plate, a base member disposed in the housing and disposed substantially parallel to the plate, and a battery (e.g., 400 of FIG. 4A, 700 of FIG. 7A, 800 of FIG. 8, 900 of FIG. 9, or 1000 of FIG. 10) disposed in an area of the base member and configured to supply power to the electronic device. The battery may include an electrode assembly (e.g., 410 of FIG. 4A, 710 of FIG. 7A, 810 of FIG. 8, 910 of FIG. 9, or 1010 of FIG. 10) including a first portion (e.g., 410*a* of FIG. 4A, 710*a* of FIG. 7A, 810*a* of FIG. 8, 910*a* of FIG. 9, or 1010*a* of FIG. 10) and a second portion (e.g., 410*b* of FIG. 4A, 710*b* of FIG. 7A, 810*b* of FIG. 8, 910*b* of FIG. 9, or 1010*b* of FIG. 10) having different sizes and a battery case (e.g., 420 of FIG. 4A, 720 of FIG. 7A, 820 of FIG. 8, 920 of FIG. 9, or 1020 of FIG. 10) including a receiving space configured to receive the electrode assembly and a sealing portion disposed along an outer periphery of the electrode assembly. A meeting portion of the first portion and the second portion may form a first curved structure. At least a portion of the sealing portion adjacent to the first curved structure may include a first elongated structure (e.g., 450 of FIG. 4A, 830 of FIG. 8, 930 of FIG. 9, or 1030 of FIG. 10) formed based on the first curved structure.

According to certain embodiments, the first elongated structure may be formed based on at least one of a curvature of the first curved structure or a width of the sealing portion.

According to certain embodiments, an elongated length of the first elongated structure may be twice, or more than, the width of the sealing portion.

According to certain embodiments, the first elongated structure may be formed by pressing the at least the portion of the sealing portion by a forming jig having a specific shape.

According to certain embodiments, the first elongated structure may include a first elongated portion (e.g., 740 of FIG. 7A) formed in an upper case (e.g., 721 of FIG. 7A) of the battery case and a second elongated portion (e.g., 730 of FIG. 7A) formed in a lower case (e.g., 722 of FIG. 7A) of the battery case. The first elongated portion and the second elongated portion may overlap each other.

According to certain embodiments, the at least the portion of the sealing portion including the first elongated structure may be sealed considering at least one of a thickness of the battery case, a width of the sealing portion, or a curvature of the first curved structure.

According to certain embodiments, the second portion of the electrode assembly may have a small size relative to the first portion and be formed to extend from a boundary of the first portion.

According to certain embodiments, the first curved structure may be formed in a portion where the boundary of the first portion and the second portion are perpendicular to each other.

According to certain embodiments, when a radius of curvature of the first elongated structure is r at plan view, the first elongated structure may include at least one of a semi-circular structure (e.g., (a) of FIG. 6) with a curvature of 1/r, a structure (e.g., (b) of FIG. 6) in which a plurality of curves having a curvature larger than 0 and smaller than 1/r are connected, or a structure (e.g., (c) of FIG. 6) in which a plurality of straight lines having a curvature of 0 are connected.

According to certain embodiments, the battery case may include an upper case and a lower case. The lower case may include an internal space formed by forming into a shape corresponding to the electrode assembly. The electrode assembly may be received in the internal space.

According to certain embodiments, the electrode assembly may further include a third portion (e.g., 910*c* of FIG. 9 or 1010*c* of FIG. 10) having a plane shape. A meeting portion of the second portion and the third portion may form a second curved structure. At least a portion of the sealing portion adjacent to the second curved structure may include a second elongated structure (e.g., 940 of FIG. 9 or 1040 of FIG. 10) formed based on the second curved structure.

According to certain embodiments, the second elongated structure may be formed based on at least one of a curvature of the second curved structure or a width of the sealing portion.

According to certain embodiments, an elongated length of the second elongated structure may be twice, or more than, the width of the sealing portion.

According to certain embodiments, the at least the portion of the sealing portion including the second elongated structure may be sealed considering at least one of a thickness of the battery case, a width of the sealing portion, or a curvature of the second curved structure.

According to certain embodiments, when a radius of curvature of the second elongated structure is r at plan view, the second elongated structure may include at least one of a semi-circular structure (e.g., (a) of FIG. 6) with a curvature of 1/r, a structure (e.g., (b) of FIG. 6) in which a plurality of curves having a curvature larger than 0 and smaller than 1/r are connected, or a structure (e.g., (c) of FIG. 6) in which a plurality of straight lines having a curvature of 0 are connected.

According to certain embodiments, the battery may further include a plurality of electrode leads welded with electrode tabs extending from the electrode assembly.

According to certain embodiments, the sealing portion disposed along the outer periphery of the electrode assembly may be heat-fusion sealed.

According to certain embodiments, the battery case may have a pouch shape of a thin film sheet configured by bonding a resin layer and a metal layer.

According to certain embodiments of the disclosure, a battery (e.g., 400 of FIG. 4A, 700 of FIG. 7A, 800 of FIG. 8, 900 of FIG. 9, or 1000 of FIG. 10) may include an electrode assembly (e.g., 410 of FIG. 4A, 710 of FIG. 7A, 810 of FIG. 8, 910 of FIG. 9, or 1010 of FIG. 10) including a first portion (e.g., 410*a* of FIG. 4A, 710*a* of FIG. 7A, 810*a* of FIG. 8, 910*a* of FIG. 9, or 1010*a* of FIG. 10) and a second portion (e.g., 410*b* of FIG. 4A, 710*b* of FIG. 7A, 810*b* of FIG. 8, 910*b* of FIG. 9, or 1010*b* of FIG. 10) having different sizes and a battery case (e.g., 420 of FIG. 4A, 720 of FIG. 7A, 820 of FIG. 8, 920 of FIG. 9, or 1020 of FIG. 10) including a receiving space configured to receive the electrode assembly and a sealing portion disposed along an outer periphery of the electrode assembly. A meeting portion of the first portion and the second portion may form a first curved structure. At least a portion of the sealing portion adjacent to the first curved structure may include a first elongated structure (e.g., 450 of FIG. 4A, 830 of FIG. 8, 930 of FIG. 9, or 1030 of FIG. 10) formed based on the first curved structure.

According to certain embodiments, a battery pack may include one or more batteries.

It is apparent to one of ordinary skill in the art that an electronic device including a battery according to certain embodiments of the disclosure as described above are not limited to the above-described embodiments and those shown in the drawings, and various changes, modifications, or alterations may be made thereto without departing from the disclosure.

What is claimed is:

1. An electronic device, comprising:

a housing including a plate;

a base member disposed in the housing and disposed substantially parallel to the plate; and a battery disposed in an area of the base member, and configured to supply power to the electronic device, wherein the battery includes:

an electrode assembly including a first portion and a second portion having different sizes; and a battery case including a receiving space that houses the electrode assembly, and a sealing portion disposed along an outer periphery of the electrode assembly, wherein the first portion and the second portion meet at a stepped corner portion, without a formation of a space recessed inward of the electrode assembly, wherein the sealing portion comprises:

a first elongated structure adjacent to the stepped corner portion and formed to be elongated when sealing the battery case;

a first outer periphery portion extending from the first elongated structure along a side surface of the first portion and facing the side surface of the first portion; and a second outer periphery portion extending from the first elongated structure along a side surface of the second portion facing to be perpendicular to the first outer periphery portion and facing the side surface of the second portion, wherein the first elongated structure smoothly connects the first outer periphery portion and the second outer periphery portion, and is formed concavely toward the stepped corner portion, wherein an elongated length of the first elongated structure is greater than a width which is defined in a direction perpendicular to the side surface of the first portion of the first outer periphery portion, and a width which is defined in a direction perpendicular to the side surface of the second portion, of the second outer periphery portion.

2. The electronic device of claim 1, wherein the first elongated structure is formed by pressing a forming jig having a specific shape into the portion of the sealing portion.

3. The electronic device of claim 1, wherein the first elongated structure includes a first elongated portion formed in an upper case of the battery case, and a second elongated portion formed in a lower case of the battery case, and wherein the first elongated portion and the second elongated portion overlap each other.

4. The electronic device of claim 1, wherein the at least the portion of the sealing portion including the first elongated structure is sealed, based upon at least one of a thickness of the battery case, or a width of the sealing portion.

5. The electronic device of claim 1, wherein the second portion of the electrode assembly is smaller than the first portion, and is formed extending from a boundary of the first portion.

6. The electronic device of claim 5, wherein the stepped corner portion is formed where respective boundaries of the first portion and the second portion at the stepped corner-portion are perpendicular to each other.

7. The electronic device of claim 1, wherein when a radius of curvature of the first elongated structure is rat plan view, the first elongated structure includes at least one of a semi-circular structure with a curvature of 1/r, a structure in which a plurality of curves having a curvature larger than O and smaller than 1/r are connected, or a structure in which a plurality of straight lines having a curvature of O are connected.

8. The electronic device of claim 1, wherein the battery case includes an upper case and a lower case, wherein the lower case includes an internal space formed into a shape corresponding at least in part to the electrode assembly, and wherein the electrode assembly is housed at least partly within the internal space.

9. The electronic device of claim 1, wherein the electrode assembly further includes a third portion having a plane shape, wherein the second portion and the third portion meet at a second stepped corner portion, and wherein the sealing portion adjacent to the second stepped corner portion where an outer peripheries of the second portion and the third portion includes a second elongated structure formed.

10. The electronic device of claim 9, wherein the sealing portion including the second elongated structure is sealed, based upon at least one of a thickness of the battery case, or a width of the sealing portion.

11. The electronic device of claim 9, wherein when a radius of curvature of the second elongated structure is r, at plan view, the second elongated structure includes at least one of a semi-circular structure with a curvature of 1/r, a structure in which a plurality of curves having a curvature larger than O and smaller than 1/r are connected, or a structure in which a plurality of straight lines having a curvature of O are connected.

12. The electronic device of claim 1, wherein an elongated length of the second elongated structure is at least twice the width of the sealing portion.

13. A battery for an electronic device, the battery comprising:

an electrode assembly including a first portion and a second portion having different sizes; and a battery case including a receiving space that houses the electrode assembly, and a sealing portion disposed along an outer periphery of the electrode assembly, wherein the first portion and the second portion meet at a stepped corner portion without a formation of a space recessed inward of the electrode assembly, and wherein the sealing portion comprises:

a first elongated structure adjacent to the stepped corner portion and formed to be elongated when sealing the battery case;

a first outer periphery portion extending from the first elongated structure along a side surface of the first portion and facing the side surface of the first portion; and a second outer periphery portion extending from the first elongated structure along a side surface of the second portion facing to be perpendicular to the first outer periphery portion and facing the side surface of the second portion, wherein the first elongated structure smoothly connects the first outer periphery portion and the second outer periphery portion, and is formed concavely toward the stepped corner portion, wherein an elongated length of the first elongated structure is greater than a width which is defined in a direction perpendicular to the side surface of the first portion of the first outer periphery portion, and a width which is defined in a direction perpendicular to the side surface of the second portion, of the second outer periphery portion.

14. The battery of claim 13, wherein the first elongated structure is formed by pressing a forming jig having a specific shape into the sealing portion.

15. The battery of claim 13, wherein the first elongated structure includes a first elongated portion formed in an upper case of the battery case, and a second elongated portion formed in a lower case of the battery case, and wherein the first elongated portion and the second elongated portion overlap each other.

* * * * *